United States Patent
Cupit

(10) Patent No.: US 10,598,231 B1
(45) Date of Patent: Mar. 24, 2020

(54) ANTI-FLUTTER CLUTCH ASSEMBLY AND RELATED METHODS

(71) Applicant: Dodson Motorsport, Glenfield, Auckland (NZ)

(72) Inventor: Glenn Cupit, Auckland (NZ)

(73) Assignee: DODSON MOTORSPORT, Auckland (NZ)

( * ) Notice: Subject to any disclaimer, the term of this patent is extended or adjusted under 35 U.S.C. 154(b) by 102 days.

(21) Appl. No.: 15/865,312

(22) Filed: Jan. 9, 2018

Related U.S. Application Data

(60) Provisional application No. 62/502,764, filed on May 8, 2017.

(51) Int. Cl.
*F16D 13/52* (2006.01)
*F16D 13/64* (2006.01)

(52) U.S. Cl.
CPC ........... *F16D 13/52* (2013.01); *F16D 13/648* (2013.01)

(58) Field of Classification Search
CPC ............................. F16D 13/52; F16D 13/648
See application file for complete search history.

(56) References Cited

U.S. PATENT DOCUMENTS

| | | | | |
|---|---|---|---|---|
| 2009/0314601 A1* | 12/2009 | Copeland | ............... | F16D 13/52 192/102 |
| 2011/0308911 A1* | 12/2011 | Heitzenrater | ......... | F16D 13/648 192/66.32 |
| 2012/0228077 A1* | 9/2012 | DeGowske | .......... | F16D 13/648 192/70.11 |
| 2015/0345569 A1* | 12/2015 | Erhard | .................... | F16D 13/69 192/70.23 |
| 2015/0369305 A1* | 12/2015 | Youngwerth | ......... | F16D 13/648 192/70.251 |

FOREIGN PATENT DOCUMENTS

| | | | | |
|---|---|---|---|---|
| DE | 102008062645 A1 * | 6/2010 | .......... | F16D 13/648 |
| DE | 102010008937 A1 * | 8/2011 | ............. | F16D 13/52 |

OTHER PUBLICATIONS

DE102008062645 machine translation, obtained from www.espacenet. com (Year: 2019).*

* cited by examiner

*Primary Examiner* — Stacey A Fluhart
(74) *Attorney, Agent, or Firm* — Allen Dyer Doppelt & Gilchrist

(57) ABSTRACT

A plurality of elastic elements are mounted to at least one of a plurality of interleaved input and output plates of a clutch stack such that, when the clutch stack is moved to a disengaged position, the plurality of elastic elements maintain separation in an axial direction between the plurality of interleaved input and output plates. Clutch flutter is avoided, reducing the drag between clutch plates.

20 Claims, 4 Drawing Sheets

ANTI-FLUTTER CLUTCH ASSEMBLY AND RELATED METHODS

CROSS-REFERENCE TO RELATED APPLICATION

This application claims the benefit of U.S. Provisional Application Ser. No. 62/502,764, filed on May 8, 2017, the contents of which are herein incorporated by reference in their entirety.

FIELD OF THE INVENTION

The present invention relates to clutches, and more particularly, to clutch assemblies with stacks of interleaved input and output plates.

BACKGROUND OF THE INVENTION

Clutches are used in many vehicles and other machines to interruptibly transfer power between a power source (e.g., an engine) and an output member (e.g., a transmission shaft). Selective interruption of power transfer is achieved by engaging and disengaging the clutch. Most clutches include a stack of interleaved input plates (also referred to as steels) linked to the power source and output plates (also referred to as frictions) linked to the output member for better power transmission. In an engaged position of the clutch, all the input and output plates in the clutch stack are pressed together, resulting in transmission of torque from the power source to the output member. In a disengaged position, the force on input and output plates is released, which results in separation of input and output plates from each other. With the clutch disengaged, the input plates ideally rotate freely at the speed of the power source without transmitting torque to the output plates.

In reality, with the clutch disengaged, the freely rotating clutch plates start to vibrate or wobble along the clutch axis which results in full or partial contact between input and output plates. This phenomenon is known as clutch "flutter." The contact between adjacent plates creates drag, which results in heat generation and spin losses affecting power transmission. The clutch flutter phenomenon also leads to the premature failure of clutch components.

SUMMARY OF THE INVENTION

In view of the foregoing, it is an object of the present invention to provide an improved clutch assembly and related methods. According to an embodiment of the present invention, a clutch assembly comprises a clutch stack and a plurality of elastic elements. The clutch stack includes a plurality of interleaved input and output plates mounted about a common clutch axis extending in an axial direction, the clutch stack being movable between an engaged position, with the interleaved input and output plates pressed together in the axial direction, and a disengaged position, with the interleaved input and output plates separated in the axial direction. The plurality of elastic elements mounted on at least one of the interleaved input and output plates. With the clutch stack in the disengaged position, the plurality of elastic elements maintain separation in the axial direction between those of the plurality of interleaved input and output plates adjacent to the at least one of the interleaved input and output plates on which the plurality of elastic elements are mounted.

According to an aspect of the present invention, the plurality of elastic elements are mounted about an outer circumference of the clutch stack. According to another aspect of the present invention, the plurality of elastic elements are mounted to at least two alternating ones of the input plates, such that two output plates and an input plate without elastic elements are sandwiched therebetween.

According to a further aspect of the present invention, the plurality of elastic elements are mounted at tooth locations on the plates and have radial and circumferential extents no greater than the teeth, such that the plurality of elastic elements can be received into corresponding tooth recesses on a clutch basket or clutch center.

According to a method aspect, a plurality of elastic elements are mounted to at least one of a plurality of interleaved input and output plates of a clutch stack such that, when the clutch stack is moved to a disengaged position, the plurality of elastic elements maintain separation in an axial direction between the plurality of interleaved input and output plates. Clutch flutter is avoided, reducing the drag between clutch plates.

These and other objects, aspects and advantages of the present invention will be better appreciated in view of the drawings and following detailed description of preferred embodiments.

DETAILED DESCRIPTION OF PREFERRED EMBODIMENTS

Figure 1:
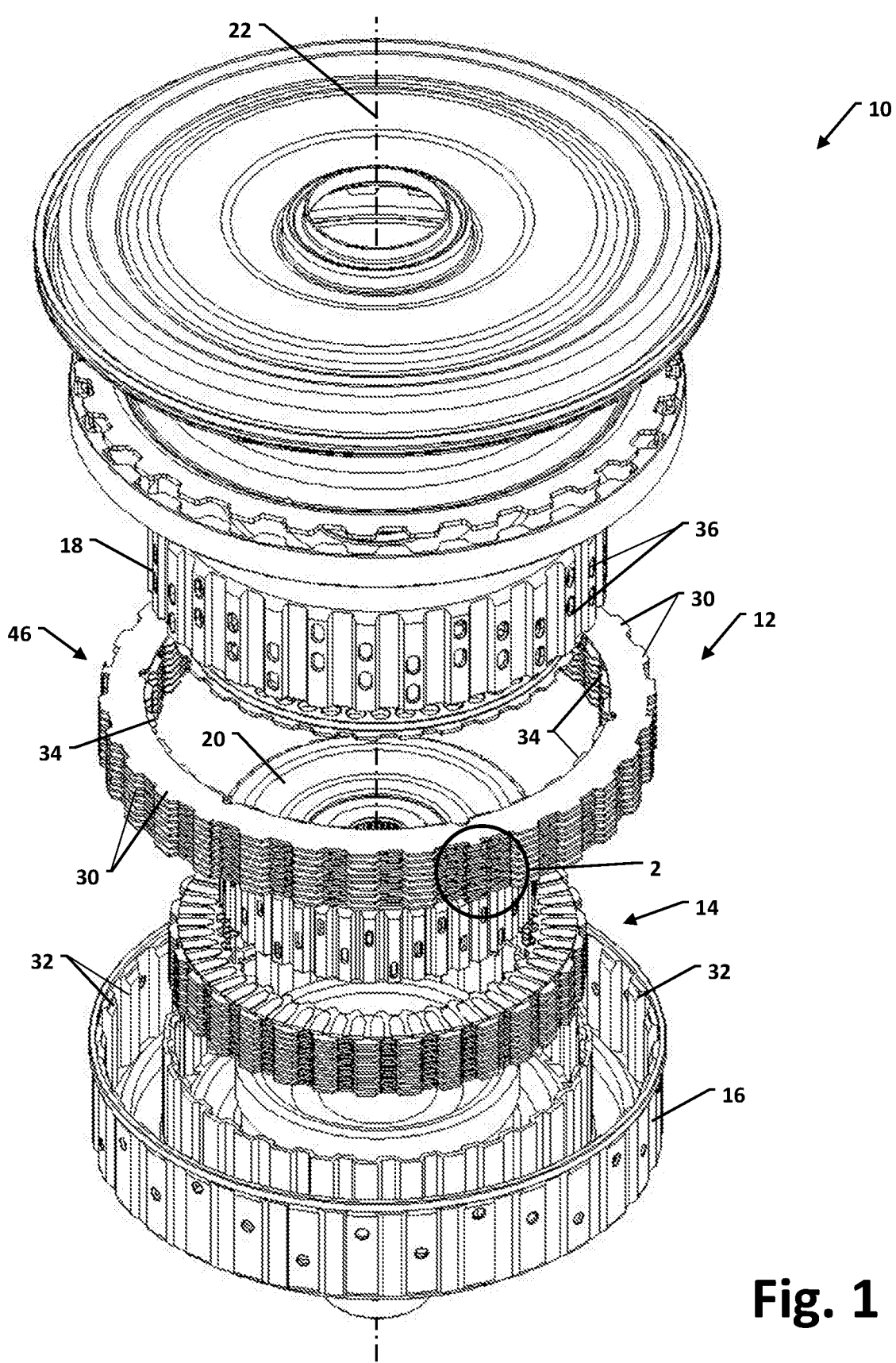
FIG. 1 is an exploded view of a clutch assembly including a stack of interleaved input and output plates and a plurality of elastic elements, according to an embodiment of the present invention.

Referring to FIG. 1, a clutch assembly 10 includes a large clutch stack 12 and a small clutch stack 14. The large clutch stack 12 transmits power from a clutch center 16 to a large basket 18, and the small clutch stack 14 transmits power from the clutch center 16 to a small basket 20. The clutch stacks 12, 14 are both concentric about a clutch axis 22 defining an axial direction.

Figure 2:
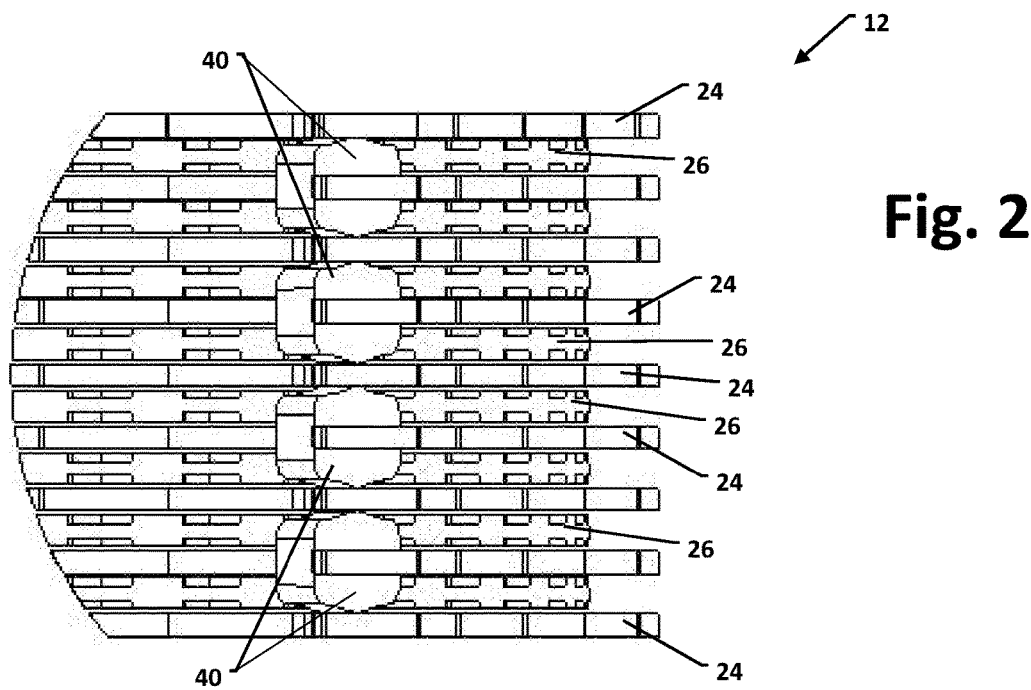
FIG. 2 is an elevational detail view of area 2 of FIG. 1.

Referring also to FIG. 2, the large clutch stack 12 includes a plurality of input plates 24 interleaved with a corresponding number of output plates 26. The input plates 24 have outer teeth 30 meshed with inner teeth 32 of the clutch center 16 and the output plates 26 have inner teeth 34 meshed with outer teeth 36 of the large basket 18. Torque is transmitted from the clutch center 16 to the large basket 18 when the input and output plates 24, 26 are pressed against each other. The construction of the small clutch stack 14 is substantially similar.

Figure 3:
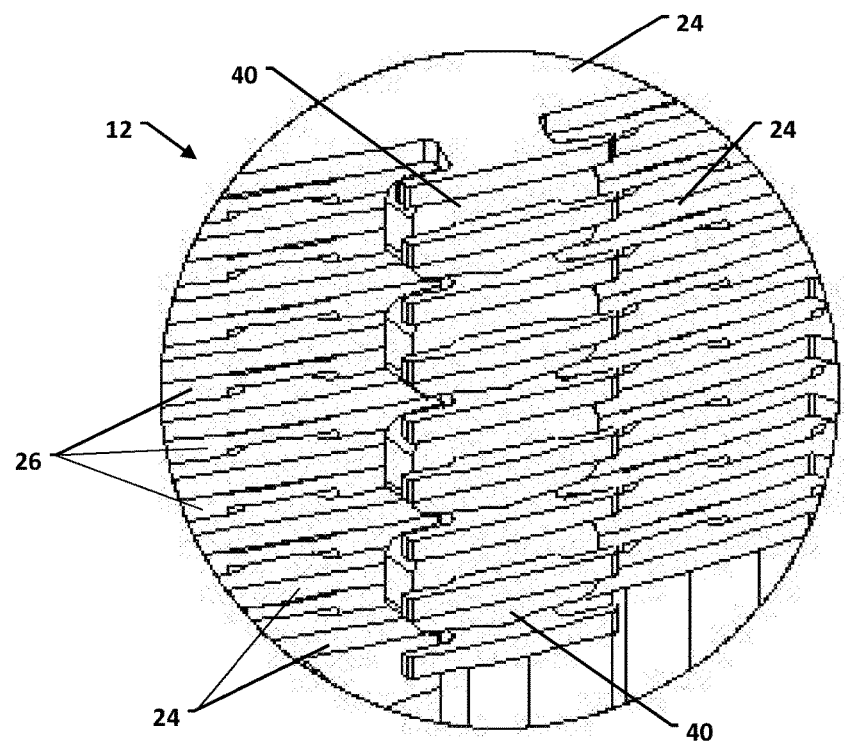
FIG. 3 is a perspective detail view of area 2 of FIG. 1.
Figure 4:
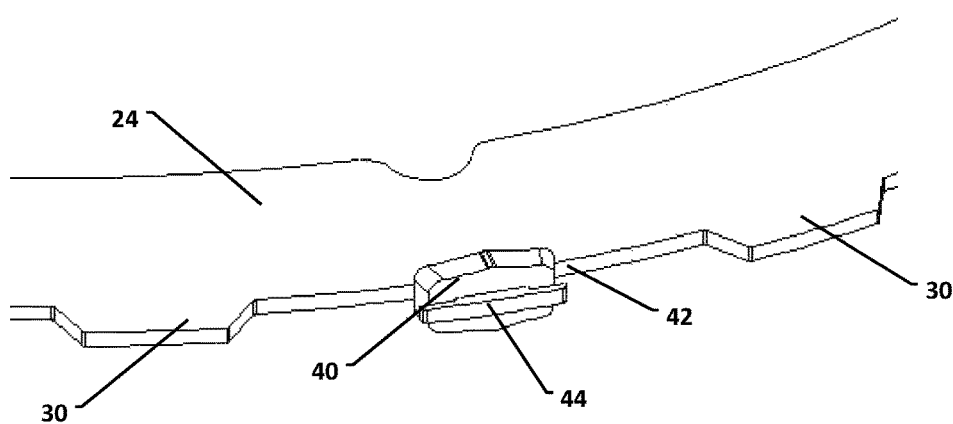
FIG. 4 is a partial perspective view of one of the input plates of FIG. 1, with an elastic element mounted thereto.
Figure 5:
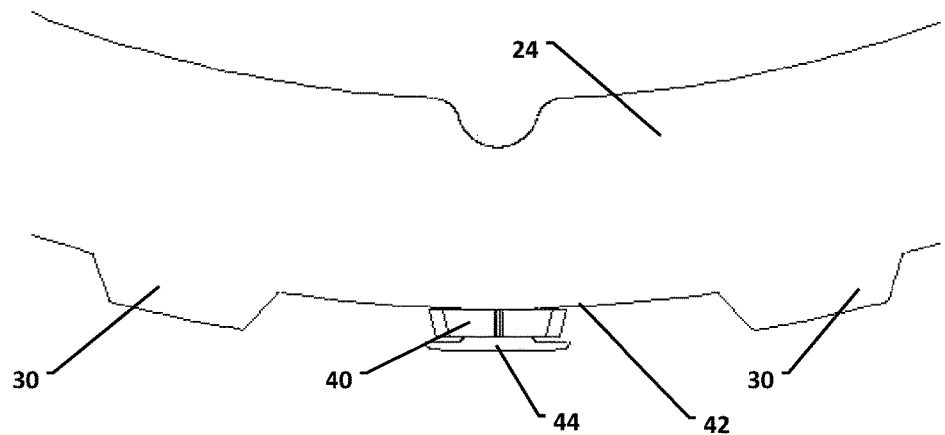
FIG. 5 is a partial axial end view of the input plate and elastic element of FIG. 4.
Figure 6:
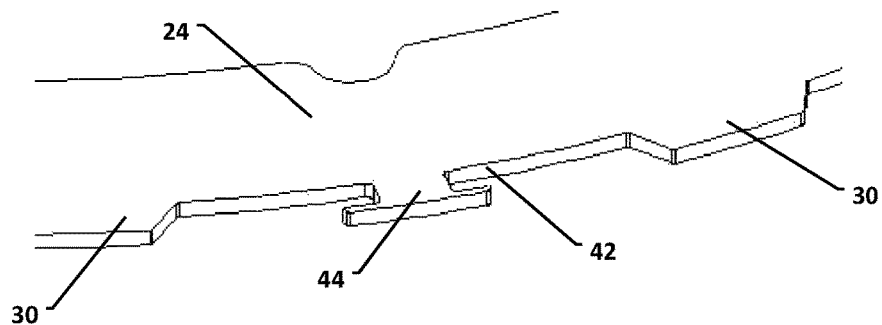
FIG. 6 is a partial perspective view of the input plate of FIG. 4, without the elastic element.
Figure 7:
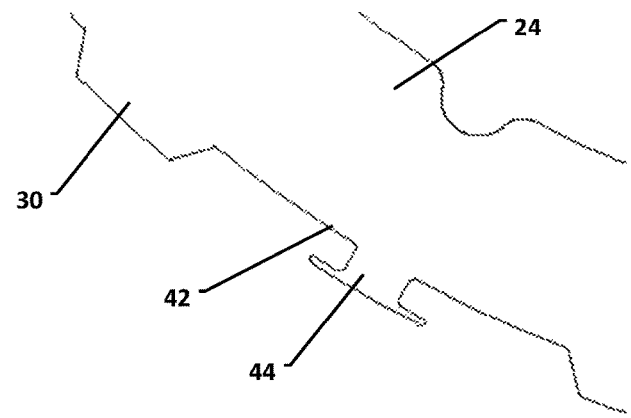
FIG. 7 is a partial axial end view of the input plate of FIG. 4, without the elastic element.

According to an embodiment of the present invention, a plurality of elastic elements 40 are mounted about the clutch axis 22 on at least one of the clutch stacks 12, 14. In particular, referring also to FIGS. 2 and 3, the plurality of elastic elements 40 are mounted on alternating ones of the input plates 24 of the large clutch stack 12 such that, between each two input plates 24 carrying elastic elements, there are sandwiched an input plate 24 not carrying elastic elements and two output plates 26. With the clutch assembly 10 engaged, the elastic elements 40 are slightly compressed and do not impact function. With the clutch assembly 10 disengaged (as shown in FIG. 2), the elastic elements 40 act as dampers absorbing vibrations during the free spinning of clutch plates 24, 26, which helps in eliminating flutter or wobble in the clutch plates 24, 26, removing the chance of full or partial contact therebetween and eliminating drag.

Referring to FIGS. 4-7, in the depicted embodiment, each elastic element 40 is located along an outer circumference of the input plate 24. More particularly, each elastic element 40 is mounted in a recessed area 42 between adjacent outer teeth 30. Advantageously, the elastic element 40 is arranged on a mounting post 44 extending radially outward from the recessed area 42. The depicted mounting post 44 is "T" shaped, such that the elastic element 40 can be stretched over the wide portion of the "T," which then retains the elastic element 40 on the post 44.

As will be appreciated from FIG. 1, the teeth 30 are located at equal angular intervals about the circumference of each input plate 24 (as are the other teeth on the other input and output plates, so as to intermesh with the clutch center 16 and respective baskets 18, 20). The elastic elements 40 are preferably mounted at tooth locations, meaning that the angular separation between elastic elements and adjacent teeth 30 is equal to the angular separation between adjacent teeth 30. Consequently, the elastic elements 40 are aligned with opposed recesses between adjacent inner teeth 32 of the clutch center 16. To ensure the mounted elastic elements 40 are properly accommodated within the opposed recesses, the radial and circumferential extents of the elements 40 on the mounting posts 44 are less than or equal to that of the teeth 30.

For economy of illustration, the elastic elements 40 are illustrated at a single circumferential location on the input plates 24. Preferably, the elastic elements are located at multiple points about the circumference. Arrow 46 in FIG. 1 indicates another mounting location, offset 120 degrees from the location indicated by area 2. A third location, offset by 120 degrees from each of these two locations would be on the far side of the clutch assembly 10.

More or fewer circumferential locations could be selected. Also, plates could be angularly offset such that elastic elements on alternating plates are not axially aligned. In the depicted embodiment, the elastic elements 40 are located along the outer circumference of input plates 24—which is believed to represent a preferred embodiment. However, the elastic elements could also be located along an inner circumference of output plates, or some combination of both. Mounting the elastic elements 40 at tooth locations is also advantageous, allowing ready modification of existing clutch assemblies by replacing and/or simply re-machining plates to be able to carry elastic elements; however, alternate locations could be used (e.g., at intermediate locations within plates).

Figure 8:
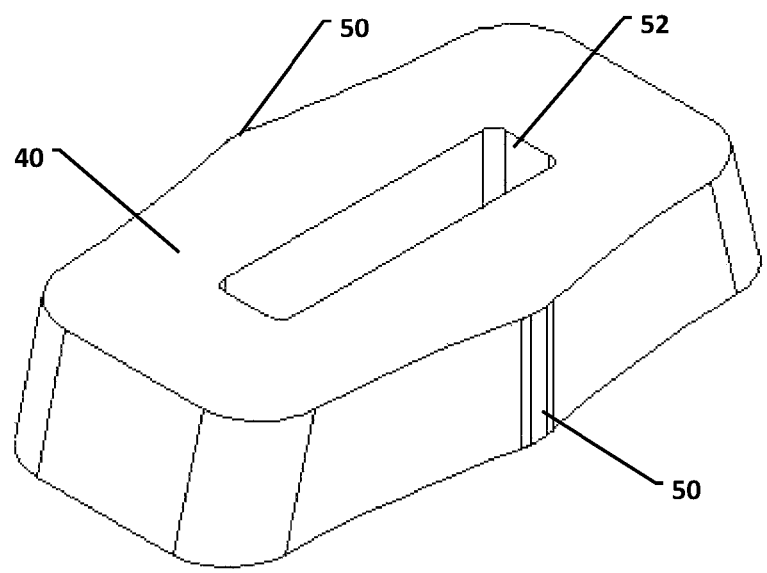
FIG. 8 is a perspective view of the elastic element of FIG. 4.
Figure 9:
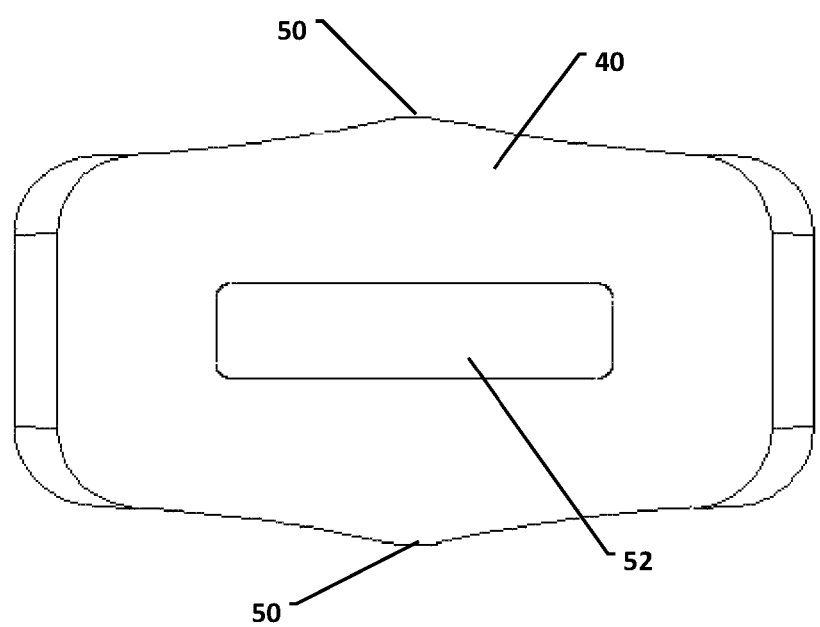
FIG. 9 is a radial end view of the elastic element of FIG. 4.

Referring to FIGS. 8 and 9, the elastic elements 40 are made in a hexagonal shape, when viewed from a radial end. Opposed axial end points 50 of the elements 40 form contact points with adjacent input plates 24. A slot 52 formed in the center of the elastic element 40 facilitates accommodation over the mounting posts 44 at the mounting locations. As used herein, the term "elastic" is defined to generically refer to an element capable of resuming its original shape after deformation. An elastomer, such as a silicone or other polysiloxane material has been found particularly suitable for the elastic elements 40. However, other elastic elements could be used, including springs or compound elements having combinations of flexible and inflexible materials.

In general, the foregoing embodiments are described for illustrative and exemplary purposes; the present invention is not necessarily limited thereto. Rather, those skilled in the art will appreciate that various modifications, as well as adaptations to particular circumstances, will fall within the scope of the invention as herein shown and described and of the claimed appended hereto.

What is claimed is:

1. A clutch assembly comprising:
   a clutch stack including a plurality of interleaved input and output plates mounted about a common clutch axis extending in an axial direction, the clutch stack being movable between an engaged position, with the interleaved input and output plates pressed together in the axial direction, and a disengaged position, with the interleaved input and output plates separated in the axial direction; and
   a plurality of elastic elements mounted on least one of the interleaved input and output plates;
   wherein, with the clutch stack in the disengaged position, the plurality of elastic elements maintain separation in the axial direction between those of the plurality of interleaved input and output plates adjacent to the at least one of the interleaved input and output plates on which the plurality of elastic elements are mounted; and
   wherein the plurality of elastic elements are mounted on a respective plurality of "T" shaped mounting posts, a narrow portion of each of the "T" shaped mounting posts extending, in a radial direction perpendicular to the axial direction, through an opening in a respective one of the plurality of elastic elements and a wide portion of each of the "T" shaped mounting posts retaining the respective one of the plurality of elastic elements thereon in the radial direction.

2. The clutch assembly of claim 1, wherein the plurality of elastic elements are mounted to the at least one of the plurality of interleaved input and output plates about an outer circumference of the clutch stack.

3. The clutch assembly of claim 1, wherein the plurality of elastic elements are mounted on at least two of the plurality of interleaved input and output plates.

4. The clutch assembly of claim 3, wherein the plurality of elastic elements are mounted on at least two of the plurality of interleaved input plates.

5. The clutch assembly of claim 4, wherein the at least two of the plurality of interleaved input plates on which the plurality of elastic elements are mounted are separated by two of the plurality of interleaved output plates and an intervening one of the plurality of interleaved input plates on which none of the plurality of elastic elements are mounted.

6. The clutch assembly of claim 4, wherein the plurality of interleaved input and output plates each include a respective plurality of teeth extending therefrom inwardly or outwardly a radial direction perpendicular to the axial direction.

7. The clutch assembly of claim 6, wherein the plurality of elastic elements are mounted to the at least one of the plurality of interleaved input and output plates so as not to extend radially inwardly or outwardly further than the respective plurality of teeth thereof.

8. The clutch assembly of claim 6, wherein the plurality of elastic elements are mounted at tooth locations on the at least one of the plurality of interleaved input and output plates.

9. The clutch assembly of claim 8, wherein each mounting location of the plurality of elastic elements includes a recess having one of the respective plurality of "T" shaped mounting posts therein.

10. The clutch assembly of claim 1, wherein each of the plurality of elastic elements has, viewed in the radial direction, a hexagonal shape.

11. The clutch assembly of claim 1, wherein each of the plurality of elastic elements is made of an elastomer.

12. A method of improving clutch operation, the method comprising:
mounting a plurality of elastic elements to at least one of a plurality of interleaved input and output plates of a clutch stack such that, when the clutch stack is moved to a disengaged position, the plurality of elastic elements maintain separation in an axial direction between the plurality of interleaved input and output plates;
wherein mounting the plurality of elastic elements includes making the at least one of the plurality of interleaved input and output plates to include a respective plurality of mounting locations, each of the respective plurality of mounting locations having a "T" shaped mounting post; and
wherein mounting the plurality of elastic elements to at least one of the plurality of interleaved input and output plates includes mounting each of the plurality of elastic elements to a respective one of the "T" shaped mounting posts at the respective plurality of mounting locations such that a narrow portion of the respective one of the "T" shaped mounting posts extends, in a radial direction perpendicular to the axial direction, through an opening in a respective one of the plurality of elastic elements and a wide portion of the respective one of the "T" shaped mounting posts retains the respective one of the plurality of elastic elements thereon in the radial direction.

13. The method of claim 12, wherein making the at least one of the plurality of interleaved input and output plates to include the respective plurality of mounting locations includes forming the plurality of mounting locations at respective tooth locations of the at least one of the plurality of interleaved input and output plates.

14. The method of claim 13, wherein forming the plurality of mounting locations at respective tooth locations of the at least one of the plurality of interleaved input and output plates includes forming a recess with a mounting post at each of the respective tooth locations.

15. The method of claim 13, wherein mounting the plurality of elastic elements includes connecting each of the plurality of elastic elements at a respective one of the plurality of mounting locations such that each the plurality of elastic elements does not extend radially inwardly or outwardly farther than a plurality of additional teeth of the at least one of the plurality of interleaved input and output plates.

16. A clutch assembly comprising:
a clutch stack including a plurality of interleaved input and output plates mounted about a common clutch axis extending in an axial direction, the plurality of interleaved input and output plates having inner and outer circumferences and radially extending teeth, the clutch stack being movable between an engaged position, with the interleaved input and output plates pressed together in the axial direction, and a disengaged position, with the interleaved input and output plates separated in the axial direction; and
a plurality of elastic elements mounted on at least one of the interleaved input and output plates at tooth locations along the radial inner or outer circumference thereof;
wherein, with the clutch stack in the disengaged position, the plurality of elastic elements maintain separation in the axial direction between those of the plurality of interleaved input and output plates adjacent to the at least one of the interleaved input and output plates on which the plurality of elastic elements are mounted; and
wherein the plurality of elastic elements are mounted on a respective plurality of "T" shaped mounting posts, a narrow portion of each of the "T" shaped mounting posts extending, in a radial direction perpendicular to the axial direction, through an opening in a respective one of the plurality of elastic elements and a wide portion of each of the "T" shaped mounting posts retaining the respective one of the plurality of elastic elements thereon in the radial direction.

17. The clutch assembly of claim 16, wherein the plurality of elastic elements are mounted on at least one of the plurality of interleaved input plates at the tooth locations thereof.

18. The clutch assembly of claim 17, wherein the plurality of elastic elements are mounted on at least two of the plurality of interleaved input plates separated by two of the plurality of interleaved output plates and an intervening one of the plurality of interleaved input plates on which none of the plurality of elastic elements are mounted.

19. The clutch assembly of claim 17, wherein the plurality of elastic elements do not extend radially farther than the teeth of the at least one of the plurality of interleaved input plates at the tooth locations thereof.

20. A clutch assembly comprising:
a clutch stack including a plurality of interleaved input and output plates mounted about a common clutch axis extending in an axial direction, the clutch stack being movable between an engaged position, with the interleaved input and output plates pressed together in the axial direction, and a disengaged position, with the interleaved input and output plates separated in the axial direction; and
a plurality of elastic elements mounted on at least one of the interleaved input and output plates;
wherein, with the clutch stack in the disengaged position, the plurality of elastic elements maintain separation in the axial direction between those of the plurality of interleaved input and output plates adjacent to the at least one of the interleaved input and output plates on which the plurality of elastic elements are mounted; and
wherein each of the plurality of elastic elements has, viewed in a radial direction perpendicular to the axial direction, a hexagonal shape.

* * * * *